(12) United States Patent
Zong et al.

(10) Patent No.: US 11,662,484 B2
(45) Date of Patent: May 30, 2023

(54) NEUTRAL ATOM IMAGING UNIT, NEUTRAL ATOM IMAGER, NEUTRAL ATOM IMAGING METHOD, AND SPACE DETECTION SYSTEM

(71) Applicant: PEKING UNIVERSITY, Beijing (CN)

(72) Inventors: Qiugang Zong, Beijing (CN); Yongfu Wang, Beijing (CN); Linghua Wang, Beijing (CN); Hong Zou, Beijing (CN); Hongfei Chen, Beijing (CN); Xiangqian Yu, Beijing (CN); Weihong Shi, Beijing (CN); Lyu Zhou, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 0 days.

(21) Appl. No.: 17/372,413

(22) Filed: Jul. 9, 2021

(65) Prior Publication Data
US 2022/0091285 A1  Mar. 24, 2022

(30) Foreign Application Priority Data
Sep. 24, 2020  (CN) .......................... 202011018464.7

(51) Int. Cl.
*G01T 1/24* (2006.01)
*G01T 1/36* (2006.01)
(Continued)

(52) U.S. Cl.
CPC ................. *G01T 1/24* (2013.01); *G01T 1/36* (2013.01); *G01T 3/08* (2013.01); *G21K 1/025* (2013.01)

(58) Field of Classification Search
CPC .... G01T 1/24; G01T 1/36; G01T 3/08; G21K 1/025
See application file for complete search history.

(56) References Cited

U.S. PATENT DOCUMENTS

2014/0312219 A1\* 10/2014 Ardelt .................. H01J 49/322
250/282

OTHER PUBLICATIONS

S. Orsini, A. M. Di Lellis, A. Milillo, et al. Low energy high angular resolution neutral atom detection by means of micro-shuttering techniques: the BepiColombo SERENA/ELENA sensor, AIP Conference Proceedings 1144, 91 (2009); https://doi.org/10.1063/1.3169310, Published Online: Jun. 17, 2009) (Year: 2009).\*

(Continued)

*Primary Examiner* — Hugh Maupin
(74) *Attorney, Agent, or Firm* — Global IP Services; Tianhua Gu

(57) ABSTRACT

The present disclosure provides a neutral atom imaging unit, a neutral atom imager, a neutral atom imaging method, and a space detection system. The neutral atom imaging unit includes at least one set of detection units, the at least one set of detection units includes: at least one semiconductor detector line array, each semiconductor detector line array includes a semiconductor detector strip composed of a plurality of semiconductor detectors; and at least one modulation grid. The modulation grid includes a slit and a slat forming the slit; the modulation grid includes a plurality of grid periods, each of the grid periods includes n slits, the width of the semiconductor detector strip is d, and the width ($w_i$) of the i-th slit of the modulation grid satisfies the following relationship:

$$w_i = \frac{n}{i} \times d.$$

24 Claims, 5 Drawing Sheets

(51) Int. Cl.
*G01T 3/08* (2006.01)
*G21K 1/02* (2006.01)

(56) References Cited

OTHER PUBLICATIONS

Mike Gruntman, Energetic neutral atom imaging of space plasmas, Department of Aerospace Engineering, MC-1191, University of Southern California, Los Angeles, California 90089-1191, Rev. Sci. Instrum., vol. 68, No. 10, Oct. 1997, (accepted for publication Jul. 18, 1997) (Year: 1997).*

* cited by examiner

NEUTRAL ATOM IMAGING UNIT, NEUTRAL ATOM IMAGER, NEUTRAL ATOM IMAGING METHOD, AND SPACE DETECTION SYSTEM

CROSS REFERENCE TO RELATED APPLICATION

This application claims the benefits of priority to Chinese Patent Application No. CN 2020110184647, entitled "Neutral Atom Imaging Unit, Neutral Atom Imager, Neutral Atom Imaging Method, and Space Detection System", filed with CNIPA on Sep. 24, 2020, the contents of which are incorporated herein by reference in its entirety.

BACKGROUND

Field of Disclosure

The present disclosure relates to the field of neutral atom imaging, in particular, to a neutral atom imaging unit, a neutral atom imager, a neutral atom imaging method, and a space detection system.

Description of Related Arts

Holistic observation and global imaging have become one of the most promising approaches to solving geospatial physics issues. Energetic Neutral Atoms (ENA) are generated during the charge exchange process between ring current ions and geocorona hot particles. ENA is not bounded by magnetic fields and can leave the source area along a straight line at the speed of the initial energetic ion. Therefore, telemetry ENA imaging provides a new opportunity to distinguish the temporal and spatial changes of space plasma.

However, the development of space neutral atom detection technology has not been easy. The extremely strong extreme ultraviolet/ultraviolet radiation (EUV/UV) background existing in the space is the biggest obstacle to reliable ENA measurements. The space community has made unremitting efforts in the field of space neutral atom detection technology.

The first attempt at direct field observation of space ENA flux was the rocket carrying test on Apr. 25, 1968. The technology of the first ENA detection instrument is based on SSD foil-stripping technology, which makes ENA become positively charged particles again, and then analyzes the newly generated positively charged particles. The subsequent development of ENA detection technology was to add a diffraction filter to filter out the background of extreme ultraviolet/ultraviolet radiation, to increase the ratio of ENA to EUV/UV photons of the sensor. However, due to the extremely strong extreme ultraviolet/ultraviolet radiation in space, the flux of the neutral components would be reduced by 20 times while the diffraction filter attenuates the extreme ultraviolet/ultraviolet radiation by 100,000 times. Therefore, the problem is still not well resolved.

Traditional low-energy ENA detectors are generally made of channel multipliers, microchannel plates and diffraction filters. However, these ENA detectors are still seriously affected by ultraviolet radiation, and almost no scientifically valuable low-energy ENA detection results in near-Earth space have been obtained.

SUMMARY

The present disclosure provides a grid imaging unit, a neutral atom imager, a neutral atom imaging system and a neutral atom imaging method, to protect the ENA detectors from being affected by the extremely strong extreme ultraviolet/ultraviolet radiation, and realize the neutral atom imaging technology with high temporal and spatial resolution.

The first aspect of the present disclosure provides a neutral atom imaging unit, including at least one set of detection units, and the at least one set of detection units includes:

at least one semiconductor detector line array; and at least one modulation grid, the at least one modulation grid is arranged in front of the at least one semiconductor detector line array and has a distance D from the semiconductor detector line array, and corresponds to the at least one semiconductor detector line array one to one, and the modulation grid performs Fourier transform on the incident neutral atom;

the modulation grid includes a slit and a slat forming the slit, the direction of the semiconductor detector line array is consistent with that of the slit of the modulation grid; the modulation grid includes a plurality of grid periods, each of the grid periods includes n slits, the width of the semiconductor detector line array is d, and the width ($w_i$) of the i-th slit of the modulation grid satisfies the following relationship:

$$w_i = \frac{n}{i} \times d.$$

Optionally, in each grid period, the width of the narrowest slit and the width of the slat forming the narrowest slit are the same as the width of the semiconductor detector line array.

Optionally, the lengths of the plurality of grid periods of the modulation grid are the same, the i-th slit in each grid period corresponds to the i-th slat, and the i-th slit has the same width as the i-th slat.

Optionally, the thickness t of the modulation grid satisfies: $t \leq \frac{1}{4}d$.

Optionally, the angular resolution of the neutral atom imaging unit is:

$$2\arctan\left(\frac{d}{2D}\right).$$

Optionally, the modulation grid includes m grid periods, $m \geq 2$ and $n \geq 3$.

Optionally, the neutral atom imaging unit further includes a collimation-and-deflection module. The collimation-and-deflection module is arranged in front of a modulation grid of at least one detection unit, and the collimation-and-deflection module includes a collimator and a deflection plate.

A second aspect of the present disclosure provides a neutral atom imager, including at least one imaging probe. The at least one imaging probe includes at least one neutral atom imaging unit provided in the first aspect of the present disclosure, at least one preamplifier unit, and at least one master-control-and-interface unit; the at least one neutral atom imaging unit, the at least one preamplifier unit, and the at least one master-control-and-interface unit are electrically connected to each other;

the at least one neutral atom imaging unit detects and images the neutral atoms;

the at least one preamplifier unit reads the imaging data of the at least one neutral atom imaging unit, and amplifies the imaging data.

Optionally, the at least one preamplifier unit includes a plurality of application-specific integrated circuits. The plurality of application-specific integrated circuits read the imaging signal of the at least one neutral atom imaging unit in real time and amplify the imaging signal.

Optionally, the preamplifier unit includes at least one charge-sensitive preamplifier, at least one multi-stage shaper, and at least one peak detector. The peak detector detects the peak value of the imaging signal and maintains the peak value until the peak value is read out.

Optionally, the at least one master-control-and-interface unit provides an operation timing to at least one application-specific integrated circuit, controls at least one application-specific integrated circuit to collect and read out the imaging signals, and preliminarily fuses and processes the imaging signal.

Optionally, the neutral atom imager further includes a data processing unit. The data processing unit receives the imaging signal transmitted by the preamplifier, and processes, packs, and compresses the imaging signal for storage.

Optionally, the neutral atom imaging unit in the at least one imaging probe is electrically connected with the data processing unit by using a master-control-and-interface unit as an interface.

Optionally, the imaging probe further includes at least one housing. The housing includes a base portion and a fan-shaped portion located above and fixedly connected to the base portion.

The collimation-and-deflection module of the neutral atom imaging unit in the imaging probe is provided on the fan-shaped portion. The outer panel of the fan-shaped portion constitutes the collimator of the collimation-and-deflection module. The deflection plate of the collimation-and-deflection module is provided on the inner side of the fan-shaped panel of the outer panel.

At least one modulation grid of the neutral atom imaging unit is provided above the base portion and close to the fan-shaped portion of the housing, and the at least one semiconductor detector line array is provided below the modulation grid.

Optionally, the plurality of application-specific integrated circuits of the preamplifier unit and the at least one master-control-and-interface unit are provided at intervals in the lower part of the housing.

Optionally, the neutral atom imager further includes a fixed enclosure. The at least one housing is spaced and at an angle in the fixed enclosure, and the middlemost housing of the at least one housings is vertically arranged in the fixed enclosure.

Preferably, the angle between the at least one housings ranges from 3° to 60°.

A third aspect of the present disclosure provides a space detection system. The space detection system includes a satellite platform and a neutral atom imager provided by the second aspect of the present disclosure, and the neutral atom imager is installed on the satellite platform. The satellite platform includes a detection microsatellite for space neutral atom imaging.

Preferably, the space detection system further includes a miniature GPS navigator, and the miniature GPS navigator is mounted on the satellite platform.

A fourth aspect of the present disclosure provides a neutral atom imaging method, including the following:
obtaining neutral atoms;
performing Fourier transform on the neutral atoms by using a modulation grid;
detecting, by a semiconductor detector line array, the neutral atoms transformed by Fourier transform, to generate an imaging signal;
the modulation grid includes a slit and a slat forming the slit, the direction of the semiconductor detector line array is consistent with that of the slit of the modulation grid; the modulation grid includes a plurality of grid periods, each of the grid periods includes n slits, the width of the semiconductor detector line array is d, and the width ($w_i$) of the i-th slit of the modulation grid satisfies the following relationship:

$$w_i = \frac{n}{i} \times d.$$

Optionally, the operation of obtaining neutral atoms includes the following:
deflecting the charged particles, and detecting the neutral atoms.

Optionally, the method further includes:
amplifying the imaging signal;
processing, packing, and compressing the amplified imaging signal.

Optionally, the operation of amplifying the imaging signal includes the following:
providing an operation timing to the at least one preamplifier unit;
collecting and reading the imaging signal according to the operation timing;
preliminarily fusing and processing the imaging signal.

Optionally, the operation of collecting and reading the imaging signal according to the operation timing further includes the following:
shaping the imaging signal, and converting the imaging signal into an analog signal;
detecting and maintaining the peak value of the imaging signal until the peak value is read out.

As described above, the neutral atom imaging unit, the neutral atom imager, the neutral atom imaging method, and the space detection system of the present disclosure have the following technical effects:

1. In the present disclosure, the grid imaging technology is applied to the field of neutral atom detection, and the widths of the slit and slat of the modulation grid are designed to be adjustable. Therefore, the widths of the slit and slat of the modulation grid may be adjusted according to actual needs to adapt to the imaging of central atoms of different energies. The imaging efficiency of neutral atoms is greatly improved, the time required for imaging is shortened, and the counting rate of imaging detection of neutral atoms is improved.

2. The energy threshold of the silicon semiconductor detector used in the present disclosure for imaging neutral atoms is reduced from the traditional 30 keV to 2 keV, which can cover the energy range of most ring current particles that generate geomagnetic storms.

3. The neutral atom imager of the present disclosure may include nearly one thousand semiconductor detectors, with the detection area reaching 200 $cm^2$ and the geometrical factor reaching 13.3 $cm^2 sr$. Therefore, the neutral atom imager of the present disclosure has good spatial resolution, time resolution and energy resolution.

4. The neutral atom imaging method of the present disclosure would not be affected by the extreme ultraviolet/ultraviolet radiation in space, thus can ensure that neutral atoms with sufficient flux participate in imaging, so as to obtain better imaging effects.

BRIEF DESCRIPTION OF THE DRAWINGS

The features and advantages of the present disclosure will be more clearly understood by referring to the drawings. The drawings are merely schematic representations and shall not be interpreted as limiting the present disclosure. In the drawings.

Figure 1:
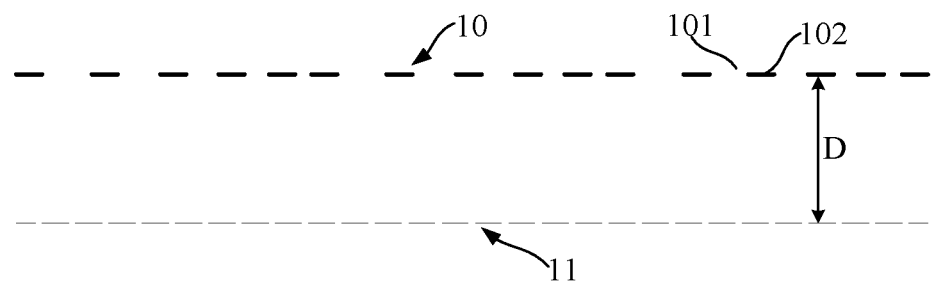
FIG. 1 is a schematic diagram of a semiconductor detector line array and a modulation grid in a set of detection units in a neutral atom imaging unit according to Embodiment 1 of the present disclosure.

| Description of reference numerals | |
|---|---|
| 10 | Modulation grid |
| 101 | Slit between grids |
| 102 | Slat forming the slit |
| 11 | Semiconductor detector line array |
| 110 | Carrier plate for semiconductor detector line array |
| 111 | Semiconductor detector strip in the semiconductor detector line array |
| 12 | The first incidence direction of neutral atoms |
| 121 | Counting rate of neutral atoms in the first incident direction |
| 13 | The second incidence direction of neutral atoms |
| 131 | Counting rate of neutral atoms in the second incident direction |
| 20 | Imaging probe |
| 21 | Housing |
| 211 | Fan-shaped portion |
| 212 | Base portion |
| 213 | Deflection plate |
| 214 | Collimator |
| 22 | Application-specific integrated circuit |
| 23 | Master-control-and-interface unit |

| Description of reference numerals | |
|---|---|
| 30 | Neutral atom imager |
| 31 | Fixed enclosure |

DETAILED DESCRIPTION OF THE PREFERRED EMBODIMENTS

In order to make the objectives, technical solutions and advantages of embodiments of the present disclosure clearer, the technical solutions in the embodiments of the present disclosure will be described clearly and completely below with reference to the drawings. The described embodiments are only a part of the embodiments of the present disclosure, instead of all embodiments of the present disclosure. All other embodiments that persons of ordinary skill in the art obtain without creative efforts based on the embodiments of the present disclosure also fall within the scope of the present disclosure.

Embodiment 1

Figure 2:
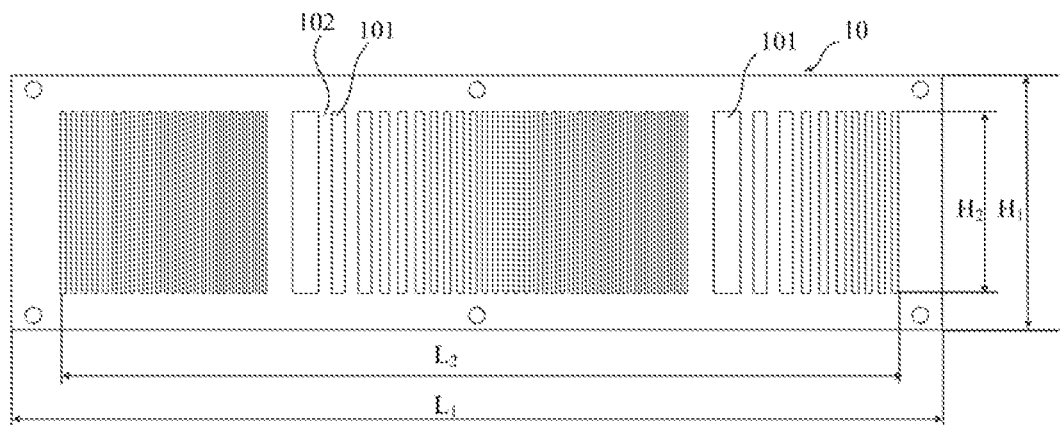
FIG. 2 is a schematic diagram showing the structure of a modulation grid of a neutral atom imaging unit according to Embodiment 1 of the present disclosure.

This embodiment provides a neutral atom imaging unit. In this embodiment, the neutral atom imaging unit includes at least one set of detection units as shown in FIG. 1. The detection unit includes a semiconductor detector line array 11 and at least one modulation unit grid 10. The modulation grid 10 is arranged in front of the semiconductor detector line array 11 and has a distance D from the semiconductor detector line array 11. The at least one modulation grid 10 and the at least one semiconductor detector line array are arranged in one-to-one correspondence. In the neutral atom imaging unit, the above-mentioned modulation grid 10 performs Fourier transform on the incident neutral atom;

FIG. 2 is a schematic structural diagram depicting a modulation grid 10 of the neutral atom imaging unit as shown in FIG. 1. In this embodiment, the modulation grid 10 includes a single-layer modulating multi-slit grid. As shown in FIG. 2, the modulation grid 10 includes a slit 101 and a slat 102 forming the slit. Each slit 101 has the same width as the slat 102 forming the slit 101, and one slit 101 and one slat 102 form a pitch. It should be understood that each slit is defined by two adjacent solid grid bars along the arrangement direction of the slits 101 shown in FIG. 2. Here, a solid grid bar 102 on the right side of a slit 101 is defined as the solid grid bar forming such slit.

Figure 3:
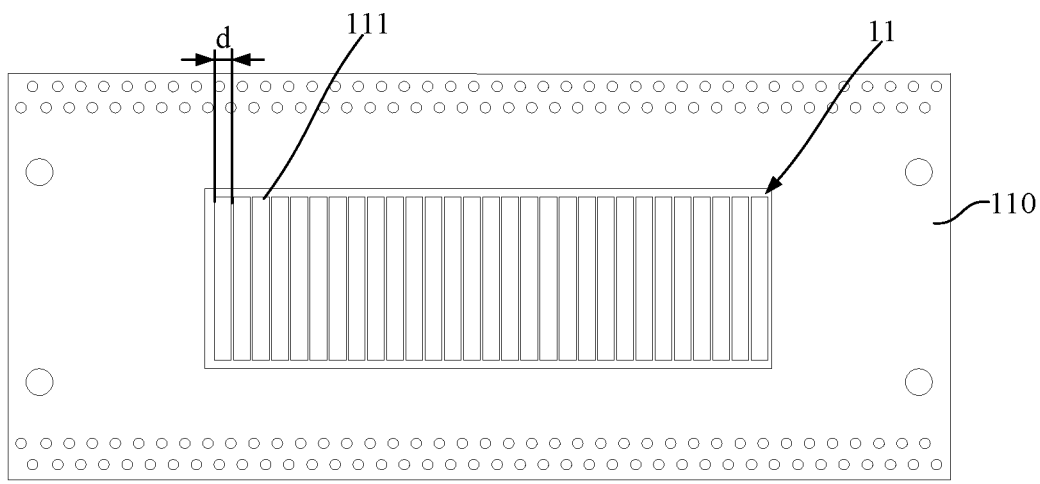
FIG. 3 is a schematic diagram showing the structure of a semiconductor detector line array of a neutral atom imaging unit according to Embodiment 1 of the present disclosure.

Referring to FIG. 3, FIG. 3 is a schematic structural diagram showing the semiconductor detector line array 11 of the above-mentioned neutral atom imaging unit. As shown in FIG. 3, the semiconductor detector line array 11 is arranged on a carrier plate 110, and the size of the carrier plate of the semiconductor detector line array ranges from 150 mm×45 mm to 180 mm×60 mm. In a more preferred embodiment of this embodiment, the distance D between the semiconductor detector line array and the modulation grid ranges from 10 mm to 15 mm. One semiconductor detector line array 11 includes a plurality of semiconductor detector strips 111. Each semiconductor detector strip 111 includes a plurality of semiconductor detectors arranged linearly. Referring again to FIG. 1, the semiconductor detector strips 111 in the semiconductor detector line array 11 extends in the same direction as the slit 101 of modulation grid 10. Preferably, the length of the semiconductor detector line array is consistent with that of the modulation grid.

In an alternative embodiment, the width of the semiconductor detector strip 111 is defined as d. The widths of the semiconductor detector strip vary with the types of semiconductor detectors.

In an alternative embodiment of this embodiment, the semiconductor detector in the semiconductor detector strip 111 includes a thin window with a threshold of about 2 keV, and a semiconductor detector (solid-state detector, SSD) with an extremely low energy threshold. The surface of the sensitive region of the semiconductor detector is coated with a polysilicon layer and an aluminum layer coated on the polysilicon layer. The width d of the semiconductor detector strips formed by the semiconductor detectors is about 0.45 mm. The gap between the semiconductor detector strips is very small, only 0.05 mm. In a more preferred embodiment, the thickness of the polysilicon layer ranges from 100 Å to 200 Å, and the thickness of the aluminum layer ranges from 100 Å to 500 Å. In the most preferred embodiment, the semiconductor detector includes a semiconductor detector with a polysilicon layer having a thickness of 100 Å, an aluminum layer having a thickness of 200 Å and a window having a thickness of 300 Å, and a semiconductor detector with a polysilicon layer having a thickness of 100 Å, an aluminum layer having a thickness of 400 Å and a window having a thickness of 500 Å. In this preferred embodiment, the particles that may be detected by the semiconductor detector include neutral hydrogen atoms (H) and oxygen atoms (O). The energy of the detected H ranges from 2 keV to 200 keV, and the energy of O ranges from 8 keV to 250 keV.

Referring again to FIG. 2, in this embodiment, one modulation grid 10 includes a plurality of grid periods, and each grid period includes a plurality of slits. The widths of the slits vary regularly over a grid period. The modulation grid 10 includes m grid periods. It is defined that a grid period contains n slits, the widest slit is the first slit, and the width of the i-th slit is wi. The width ($w_i$) of the i-th slit and the width (d) of the semiconductor detector line array satisfy the following relationship:

$$w_i = \frac{n}{i} \times d.$$

In a preferred embodiment, the width of the narrowest slit (i.e., the n-th slit) in a grid period is defined to be the same as the width d of the semiconductor detector strip, that is, $w_i$=d. In an embodiment, m≥2 and n≥8. According to the above formula of slit width, the widths of each slit and the slat forming the slit in a grid period can be determined, and the required modulation grid may thus be formed according to the number of grid periods in the modulation grid. Based on the principle of neutral atom imaging, the thickness of the modulation grid should be as small as possible, and the ideal thickness is 0. In this embodiment, in order to obtain as thin a modulation grid as possible, the thickness of the modulation grid is defined as t, which satisfies: t≤¼d. In a more preferred embodiment, the thickness of the modulation grid is close to 0.1 mm.

As described above, after determining the width d of the semiconductor detector strip (that is, the width of the narrowest slit in the modulation grid), and the distance D between the modulation grid and the semiconductor detector line array, the angular resolution of the neutral atom imaging unit can be determined as follows:

$$2\arctan\left(\frac{d}{2D}\right).$$

Still referring to FIG. 2, in a preferred embodiment, the outer length $L_1$ of the modulation grid 10 ranges from 120 mm to 130 mm, the inner length $L_2$ of the modulation grid 10 ranges from 110 mm to 120 mm. The outer width $H_1$ of the modulation grid 10 ranges from 30 mm to 50 mm, and the inner width $H_2$ of the modulation grid 10 ranges from 20 mm to 30 mm. That is, the size of the multi-slit grid ranges from 120 mm×30 mm to 130 mm×50 mm. The thickness of the multi-slit grid may be 0.1 mm or 0.2 mm.

Figure 4:
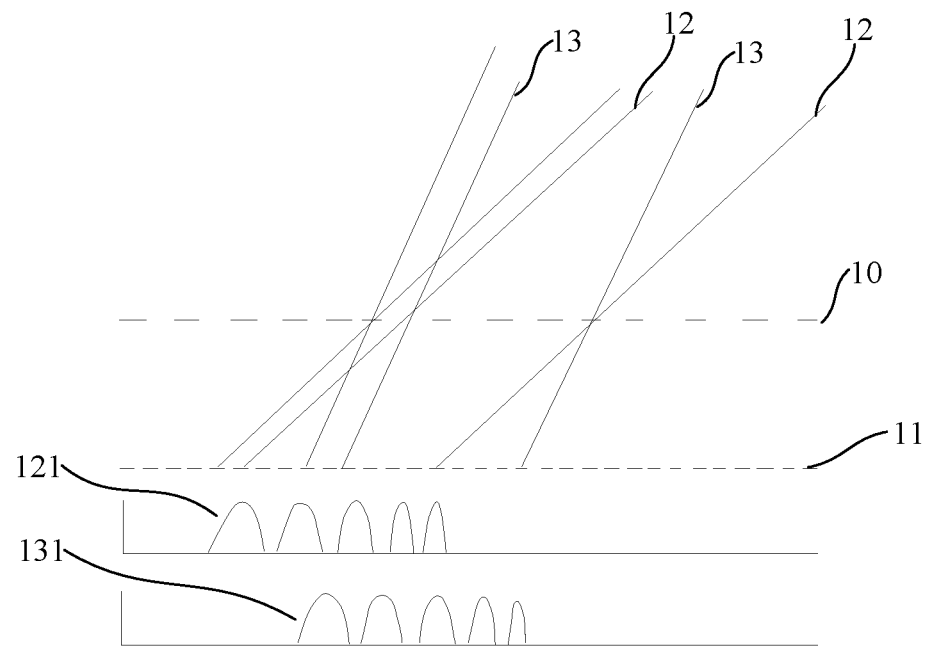
FIG. 4 is a schematic diagram showing the imaging principle of a set of semiconductor detector line array and modulation grid of a neutral atom imaging unit according to Embodiment 1 of the present disclosure.

In another alternative embodiment of this embodiment, as shown in FIG. 4, the principle of the detection unit of the neutral atom imaging unit shown in FIG. 1 is illustrated. As shown in FIG. 4, neutral atoms from the same incident direction (i.e., having the same velocity), such as those from the first incident direction 12 or the second incident direction 13, pass through the modulating multi-slit grid with varying to slit widths. The modulating multi-slit grid performs Fourier transform on the incident neutral atom, such that the counting rate of neutral atoms received by the detector line array would vary with the position of the detector. As shown in FIG. 4, the counting rate 121 of the detector line array for neutral atoms in the first incident direction 12 and the counting rate 131 of the detector line array for neutral atoms in the second incident direction 13 vary with the position of the detector. For different incident directions, such as the first incident direction 12 and the second incident direction 13, the Fourier transform of the modulating multi-slit grid is different. Using the above-mentioned characteristics of the neutral atom imaging unit and performing Fourier inversion on the neutral atoms sensed by the semiconductor detector line array, the spatial distribution of the neutral atoms in different directions can be obtained, thereby obtaining the position and size of the active region.

In another preferred embodiment, the neutral atom imaging unit further includes a collimation-and-deflection module, and the collimation-and-deflection module includes a collimator and a deflection plate. The collimation-and-deflection module includes a collimator and a deflection plate. By applying a deflection voltage to the deflection plate, the charged particles, such as various electrons and ions, are deflected away, such that the grid imaging unit only detects the neutral atoms and images the neutral atoms.

Figure 5:
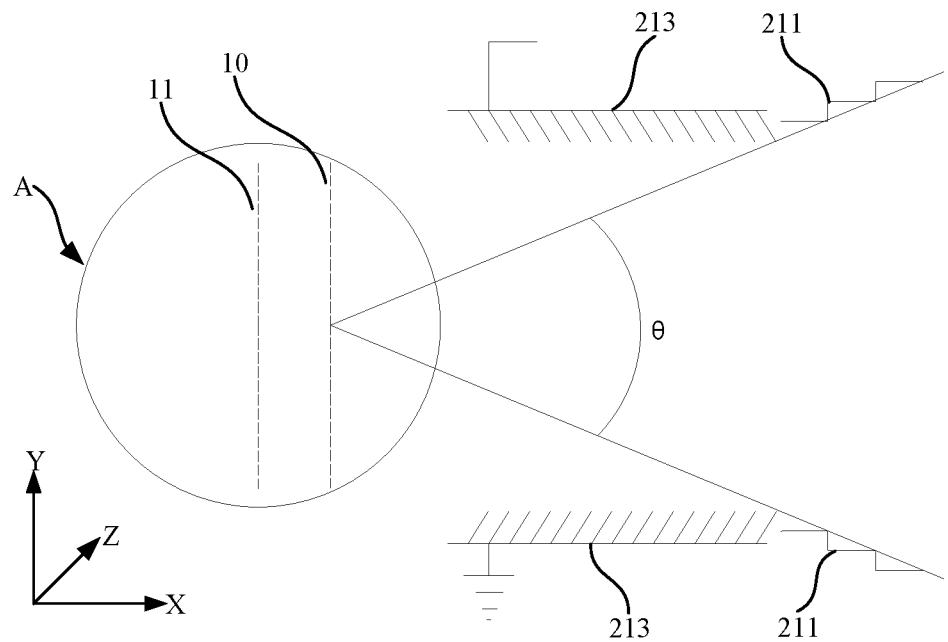
FIG. 5 is a schematic diagram showing the principle of a neutral atom imaging unit according to Embodiment 1 of the present disclosure.

FIG. 5 is a schematic diagram showing the principle of the neutral atom imaging unit. In FIG. 5, the imaging opening angle in the neutral atom imaging unit is 45°. In FIG. 5, for ease of illustration, the modulation grid 10 and semiconductor detector line array 11 of the neutral atom imaging unit are shown in the XY directions. However, during the actual imaging process, the modulation grid and semiconductor detector line array of the neutral atom imaging unit are placed along the YZ plane shown in FIG. 5, with an imaging opening angle of 45°. The neutral atoms are detected and imaged by the neutral atom imaging unit within a 45° field of view on the XZ plane. That is, the view of the circle A in FIG. 5 is actually a view rotated by 90° along the normal direction of the YZ plane. The field angle of the neutral atom imaging unit in the XY plane is 10°. In this preferred embodiment, the length of the deflection plate 213 is set to 190 mm, the distance between the two deflection plates is set to 30 mm, and the distance between the deflection plate 213 and the modulation grid 10 is set to 30 mm. A voltage of 6 kV is applied to the deflection plate 213. The particles (including neutral atoms and various charged particles) passing through the collimator 214 enter the deflection plate 213 with the above voltage. The deflection plate 213 deflects the various charged particles. In this embodiment, the above-mentioned deflection plate can deflect most of the charged particles of 30 keV, such that only neutral atoms could enter the neutral atom imaging unit. The modulation grid of the neutral atom imaging unit performs Fourier transform on the neutral atoms, and the semiconductor detector detects and images the neutral atoms.

Figure 6:
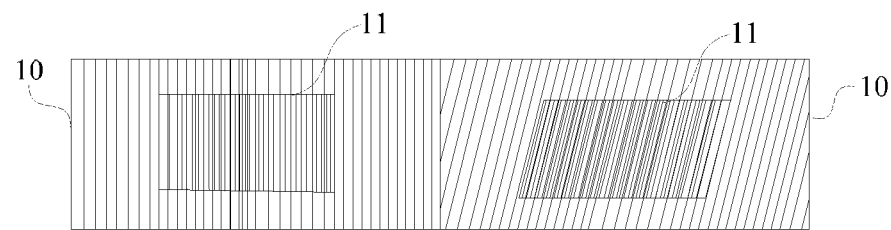
FIG. 6 is an enlarged schematic diagram showing the circle A part in FIG. 5.

Further referring to FIG. 6, FIG. 6 shows an enlarged schematic diagram of the circle A part in FIG. 5. In the above-mentioned preferred embodiment of this embodiment, two adjacent sets of detection units in the neutral atom imaging unit are shown. Each set of detection units includes a modulation grid 10 and a semiconductor detector line array 11. In each set of detection units, the direction of the semiconductor detector line array is consistent with that of the slits of the modulation grid. In the two adjacent sets of detection units, the directions of the slits of the modulation grids (or the detector line arrays) differ by 18°. Therefore, for a neutral atom imaging unit including at least one set of detection units, the Fourier transform may be performed on the incident neutral atom in different directions For example, in a more preferred embodiment, the neutral atom imaging unit may include 10 sets of the aforementioned detection units, such that the neutral atom imaging unit includes 10 sets of semiconductor line arrays and modulation grids. In a more preferred embodiment, each semiconductor detector line array may include 256 semiconductor detectors. Therefore, the neutral atom imaging unit may include 10×256=2560 semiconductor detectors. The semiconductor detector line array may obtain modulation signals generated by the modulation grids in 10 different directions at the same time. The field of view of the neutral atom imaging unit is a two-dimensional cone with an opening angle of 45°, and the angular resolution may reach about 2°. Therefore, the neutral atom imager can provide a neutral atom imaging unit with high sensitivity, large field of view, and high angular resolution.

Embodiment 2

Figure 7:
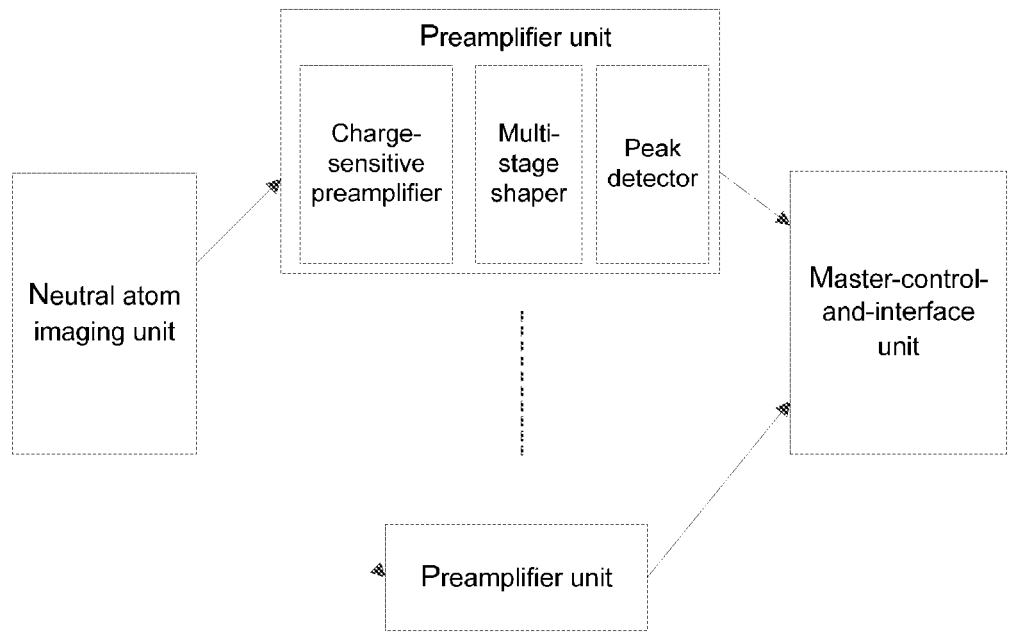
FIG. 7 is a schematic diagram showing the structure of a neutral atom imager according to Embodiment 2 of the present disclosure.

As shown in FIG. 7, this embodiment provides a neutral atom imager, which includes at least one neutral atom imaging unit, at least one preamplifier unit, and at least one master-control-and-interface unit; the at least one neutral atom imaging unit, the at least one preamplifier unit, and the at least one master-control-and-interface unit are electrically connected to each other.

The at least one neutral atom imaging unit detects and images neutral atoms. The at least one preamplifier unit reads the imaging data of the at least one neutral atom imaging unit, and preliminarily amplifies the imaging data.

The preamplifier unit includes a plurality of application-specific integrated circuits. The application-specific integrated circuits read the imaging signal of the at least one neutral atom imaging unit in real time and amplify the imaging signal.

Still referring to FIG. 7, in a preferred embodiment, the preamplifier unit includes at least one charge-sensitive preamplifier, at least one multi-stage shaper, and at least one peak detector. The peak detector detects the peak value of the imaging signal and maintains the peak value until the peak value is read out.

In another preferred embodiment, the master-control-and-interface unit provides an operation timing to at least one application-specific integrated circuit, controls at least one application-specific integrated circuit to collect and read out the imaging signal, and performs preliminarily fuse and process the imaging signal.

Figure 8:
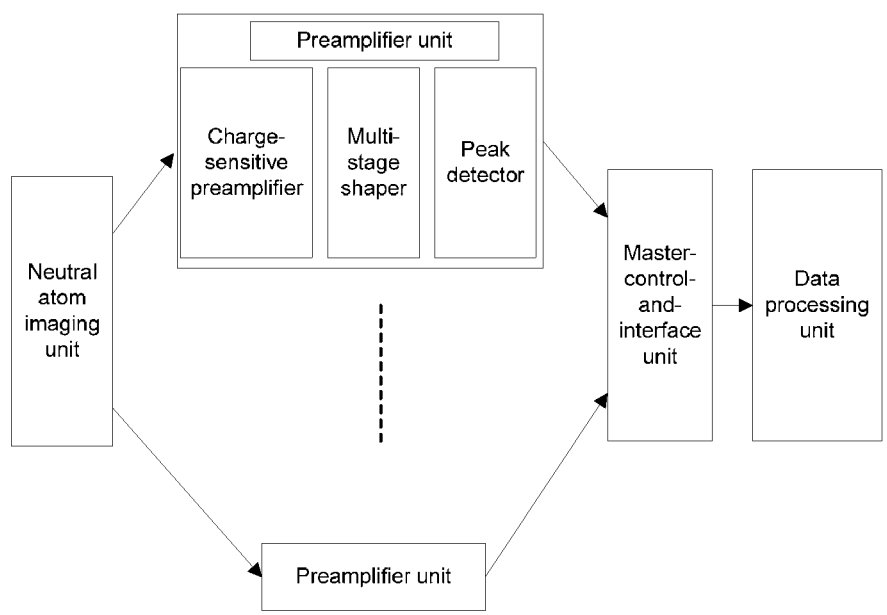
FIG. 8 is a schematic diagram showing the structure of a neutral atom imager according to a preferred embodiment of Embodiment 2 of the present disclosure.

In another preferred embodiment, as shown in FIG. 8, the neutral atom imager further includes a data processing unit. The data processing unit receives the imaging signal transmitted by the preamplifier in the neutral atom imager, and processes, packs, and compresses the imaging signal for storage.

In a preferred embodiment, at least one neutral atomic imaging unit communicatively connects with the data processing unit by using the master-control-and-interface unit of the at least one neutral atomic imaging unit as an interface.

Embodiment 3

Figure 9:
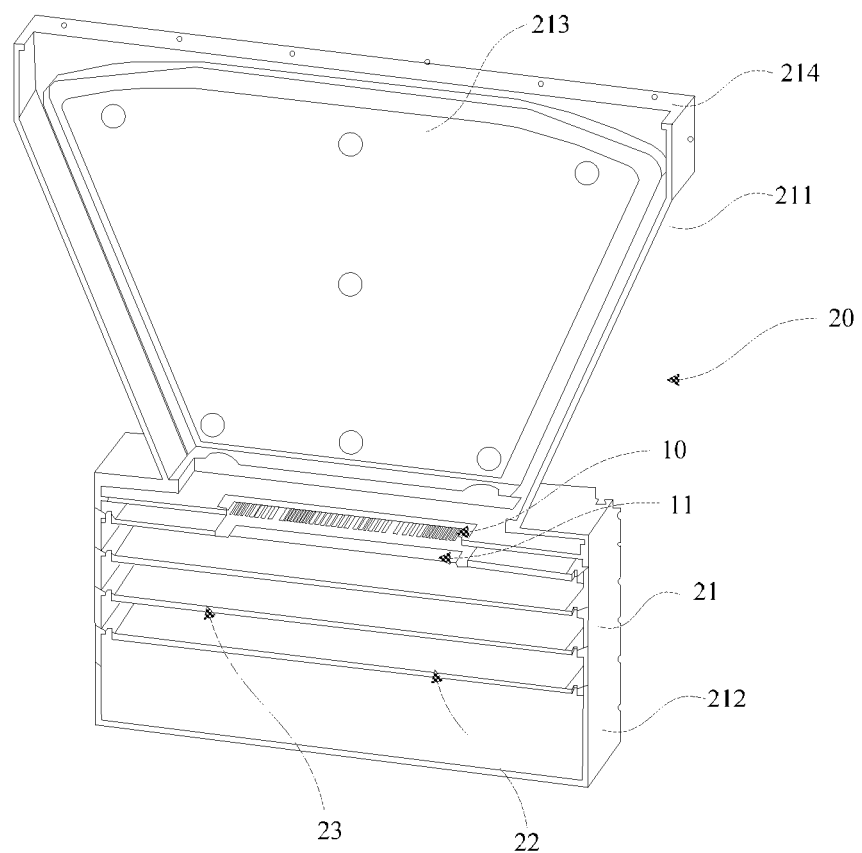
FIG. 9 is a schematic diagram showing the structure of a housing of a neutral atom imager according to Embodiment 2 of the present disclosure.

This embodiment also provides a neutral atom imager. As shown in FIG. 9, the imaging probe 20 of the neutral atom imager further includes at least one housing 21. The housing 21 includes a base portion 212 and a fan-shaped portion 211 located above and fixedly connected to the base portion 212. In a more preferred embodiment, the fan-shaped portion 211 and the base portion 212 may be integrally formed, or may be fixedly connected by screw fastening, riveting, welding or the like. As shown in FIG. 9, the collimation-and-deflection module of the neutral atom imaging unit is provided on the fan-shaped portion 211. The outer panel of the fan-shaped portion 211 constitutes the collimator 214 of the collimation-and-deflection module. The deflection plate 213 is provided on the inner side of the fan-shaped panel of the outer panel. At least one detection unit of the neutral atom imaging unit is provided above the base portion 212 of the housing 21. The modulation grid 10 of the detection unit is close to the fan-shaped portion 211. The semiconductor detector line array is provided below the modulation grid 10. For example, in a more preferred embodiment, the distance between the modulation grid 10 and the semiconductor detector line array ranges from 10 mm to 15 mm.

Still referring to FIG. 9, a plurality of application-specific integrated circuits 22 and a master-control-and-interface unit 23 are provided inside the base portion 212 of the housing 21. The plurality of application-specific integrated circuits 22 and the master-control-and-interface unit 23 may be multiple layers spaced and alternatively arranged, or may be integrated in the same layer.

Figure 10:
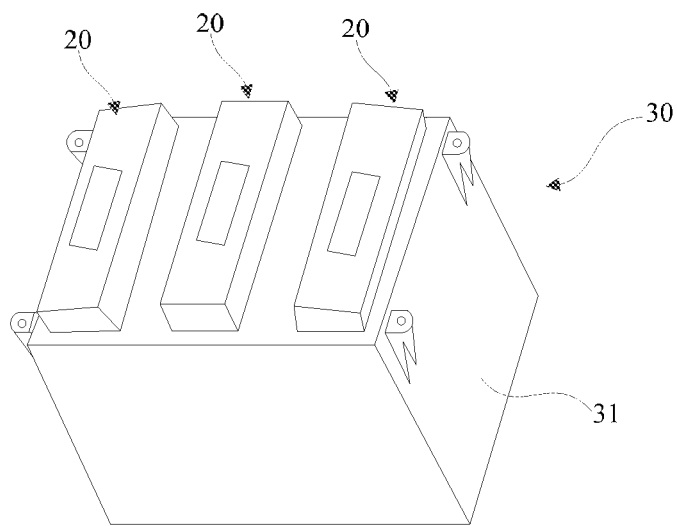
FIG. 10 is a schematic diagram showing the structure of a fixed enclosure of a neutral atom imager according to Embodiment 2 of the present disclosure.

As shown in FIG. 10, in another preferred embodiment, the neutral atom imager 30 further includes a fixed enclosure 31. At least one imaging probe 20 is provided in the fixed enclosure 31 in the form of an integral member formed by the housing 21. Preferably, the imaging probes 20 are spaced and at an angle in the fixed enclosure 31. In a more preferred embodiment, the neutral atom imager 20 in the middle is vertically arranged in the fixed enclosure 31.

In the preferred embodiment shown in FIG. 10, the neutral atom imager 30 includes three imaging probes 20. The imaging probe in the middle is vertically arranged in the fixed enclosure 31, and the imaging probes 20 on both sides are arranged at intervals in the fixed enclosure 31 and are at an angle to the imaging probe in the middle, respectively. The angle may range from 3° to 60°, for example, in this embodiment, the angle is 10°.

In the preferred embodiment shown in FIG. 10, the neutral atom imager 30 includes three imaging probes 20, and each imaging probe includes a neutral atom imaging unit. As described in the more preferred embodiment of the Embodiment 1, each neutral atom imaging unit may include 10 sets of detection units, and each detection unit includes a 256 semiconductor detector line array and a modulation grid arranged in front of the 256 semiconductor detector line array. Therefore, the above-mentioned 10 sets of detection units may obtain modulation signals generated by the modulation grid in 10 different directions of the source area particles at the same time. The field of view of each neutral atom imaging unit is 10°×45°. The neutral atom imager of this embodiment includes 10×256=2560 semiconductor detectors. In the 256 line array SSD, the area of each semiconductor detector unit is about 0.08 cm². Therefore, the area of 2560 SSDs of the neutral atom imager of this preferred embodiment is about 204.8 cm². Therefore, the field of view of the neutral atom imaging system is a two-dimensional cone with an opening angle of 45°, and the angular resolution may reach about 2°. Therefore, the neutral atom imager, including nearly a thousand semiconductor detectors, is capable of measuring neutral atoms from all directions with high spatial resolution, such as 2°×2°. The energy of detected H ranges from 2 keV to 200 keV, and the energy of O ranges from 8 keV to 250 keV, with high energy resolution such as ΔE/E−1 keV. Further, the neutral atom imager has a high time resolution, such as 1 to 10 seconds.

Embodiment 4

Figure 11:
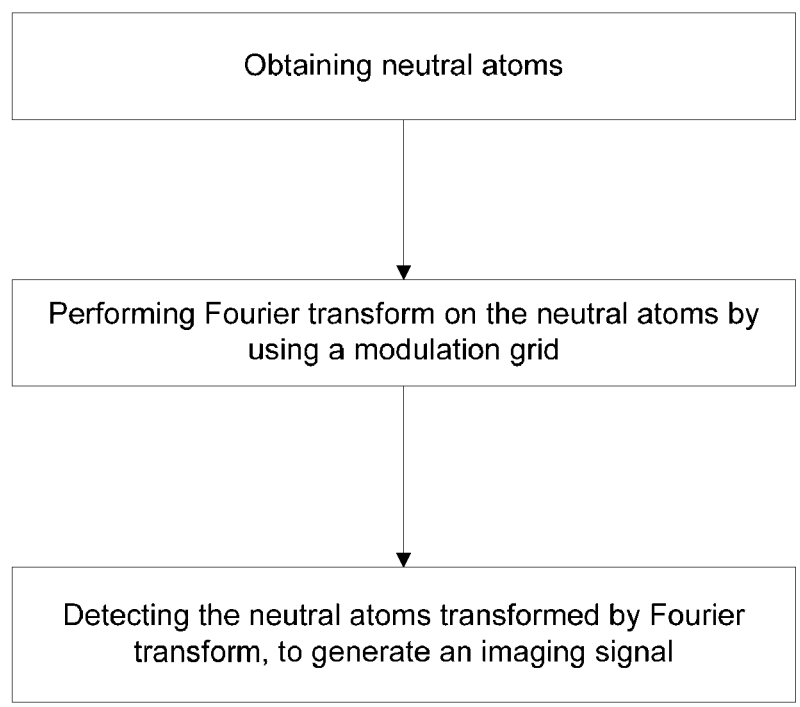
FIG. 11 is a schematic flowchart of a neutral atom imaging method according to Embodiment 4 of the present disclosure.

This embodiment provides a neutral atom imaging method, which performs imaging by the neutral atom imaging system described in Embodiment 3. As shown in FIG. 11, the neutral atom imaging method includes the following operations:
obtaining neutral atoms;
performing Fourier transform on the neutral atoms;
detecting the neutral atoms transformed by Fourier transform, to generate an imaging signal.

In a preferred embodiment of this embodiment, the operation of obtaining neutral atoms further includes the following:
deflecting the charged particles, such that only neutral atoms are detected.

In a preferred embodiment of this embodiment, the neutral atom imaging method further includes the following operations:
amplifying the imaging signals;
processing, packing, and compressing the amplified imaging signal.

In another preferred embodiment of this embodiment, the operation of amplifying the imaging signals further includes the following:
providing an operation timing to the at least one preamplifier unit;
collecting and reading the imaging signal according to the operation timing;
preliminarily fusing and processing the imaging signal.

In another preferred embodiment of this embodiment, the operation of collecting and reading the imaging signals according to the operation timing further includes the following:
shaping the imaging signal to convert the imaging signal into an analog signal;
detecting and maintaining the peak value of the imaging signal until the peak value is read out.

In summary, the neutral atom imaging unit, the neutral atom imager, the neutral atom imaging method, and the space detection system provided by the foregoing embodiments of the present disclosure have the following technical effects:

1. In the present disclosure, the grid imaging technology is applied to the field of neutral atom detection, and the widths of the slit and slat of the modulation grid are adjusted to be adjustable. Therefore, the widths of the slit and slat of the modulation grid may be designed according to actual needs to adapt to the imaging of central atoms of different energies. The imaging efficiency of neutral atoms is greatly improved, the time required for imaging is shortened, and the counting rate of imaging detection of neutral atoms is improved.

2. The energy threshold of the silicon semiconductor detector used in the present disclosure for imaging neutral atoms is reduced from the traditional 30 keV to 2 keV, which can cover the energy range of most ring current particles that generate geomagnetic storms.

3. The neutral atom imager of the present disclosure may include nearly one thousand semiconductor detectors, with the detection area reaching 200 cm² and the geometrical factor reaching 13.3 cm²sr. Therefore, the neutral atom imager of the present disclosure has good spatial resolution, time resolution and energy resolution.

4. The neutral atom imaging method of the present disclosure would not be affected by the extreme ultraviolet/ultraviolet radiation in space, thus can ensure that neutral atoms with sufficient flux may participate in imaging, so as to obtain better imaging effects.

The above-mentioned embodiments are just used for exemplarily describing the principle and effects of the present disclosure instead of limiting the present disclosure. Various changes and variations may be made by the skilled in the art without departing the spirit and scope of the present disclosure. The above changes and variations fall within the scope as specified by the appended claims.

What is claimed is:

1. A neutral atom imaging unit, comprising at least one set of detection units, and the at least one set of detection units includes:
at least one semiconductor detector line array, wherein each semiconductor detector line array includes a plurality of semiconductor detector strips composed of a plurality of semiconductor detectors; and
at least one modulation grid, wherein the at least one modulation grid is arranged in front of the at least one semiconductor detector line array and has a distance D from the semiconductor detector line array, and corresponds to the at least one semiconductor detector line array one to one, wherein the modulation grid is used for performing Fourier transform on an incident neutral atom;
wherein the modulation grid includes a plurality of slits and a plurality of slats forming the plurality of slits, an extending direction of the plurality of semiconductor detector strips is consistent with that of the plurality of slits of the modulation grid; the modulation grid includes a plurality of grid periods, each of the grid periods includes n slits, a width of each of the plurality of semiconductor detector strips is d, widths of the slits vary regularly over a grid period, and a width $w_i$ of an i-th slit of the modulation grid satisfies the following relationship:

$$w_t = \frac{n}{t} \times d.$$

2. The neutral atom imaging unit according to claim 1, wherein in each of the grid periods, a width of a narrowest slit and a width of the slat forming the narrowest slit are the same as a width of the semiconductor detector strip.

3. The neutral atom imaging unit according to claim 1, wherein lengths of the plurality of grid periods of the modulation grid are the same, the i-th slit in each grid period corresponds to an i-th slat, and the i-th slit has the same width as the i-th slat.

4. The neutral atom imaging unit according to claim 1, wherein a thickness t of the modulation grid satisfies:

$$t \le \frac{1}{4}d.$$

5. The neutral atom imaging unit according to claim 1, wherein an angular resolution of the neutral atom imaging unit is:

$$2\arctan\left(\frac{d}{2D}\right).$$

6. The neutral atom imaging unit according to claim 1, wherein the modulation grid includes m grid periods, m≥2 and n≥8.

7. The neutral atom imaging unit according to claim 1, wherein the neutral atom imaging unit further comprises a collimation-and-deflection module, the collimation-and-deflection module is arranged in front of a modulation grid of at least one detection unit, and the collimation-and-deflection module includes a collimator and a deflection plate.

8. A neutral atom imager, comprising at least one imaging probe, wherein the at least one imaging probe includes at least one neutral atom imaging unit according to claim 1, at least one preamplifier unit, and at least one master-control-and-interface unit; the at least one neutral atom imaging unit, the at least one preamplifier unit, and the at least one master-control-and-interface unit are electrically connected to each other;
the at least one neutral atom imaging unit detects and images neutral atoms;
the at least one preamplifier unit reads imaging data of the at least one neutral atom imaging unit, and amplifies the imaging data.

9. The neutral atom imager according to claim 8, wherein the at least one preamplifier unit includes a plurality of application-specific integrated circuits, the application-specific integrated circuits read a imaging signal of the at least one neutral atom imaging unit in real time and amplify the imaging signal.

10. The neutral atom imager according to claim 9, wherein the preamplifier unit includes at least one charge-sensitive preamplifier, at least one multi-stage shaper, and at least one peak detector; the peak detector detects a peak value of the imaging signal and maintains the peak value until the peak value is read out.

11. The neutral atom imager according to claim 9, wherein the at least one master-control-and-interface unit provides an operation timing to at least one application-specific integrated circuit, controls at least one application-specific integrated circuit to collect and read out the imaging signal, and preliminarily fuses and processes the imaging signal.

12. A space detection system, comprising a satellite platform and a neutral atom imager according to claim 9, wherein the neutral atom imager is installed on the satellite platform, and the satellite platform includes a detection microsatellite for space neutral atom imaging.

13. The space detection system according to claim 12, further comprising a miniature GPS navigator, wherein the miniature GPS navigator is mounted on the satellite platform.

14. The neutral atom imager according to claim 8, wherein the neutral atom imager further includes a data processing unit; the data processing unit receives the imaging signal transmitted by the preamplifier, and processes, packs, and compresses the imaging signal for storage.

15. The neutral atom imager according to claim 14, wherein the neutral atom imaging unit in the at least one imaging probe is electrically connected with the data processing unit by using a master-control-and-interface unit as an interface.

16. The neutral atom imager according to claim 8, wherein the at least one imaging probe further includes at least one housing, the housing includes a base portion and a fan-shaped portion located above and fixedly connected to the base portion;
a collimation-and-deflection module of the neutral atom imaging unit in the imaging probe is provided on the fan-shaped portion, an outer panel of the fan-shaped portion constitutes a collimator of the collimation-and-deflection module, and a deflection plate of the collimation-and-deflection module is provided on an inner side of a fan-shaped panel of the outer panel;
at least one modulation grid of the neutral atom imaging unit is provided above the base portion and close to the fan-shaped portion of the housing, and the at least one semiconductor detector line array is provided below the modulation grid.

17. The neutral atom imager according to claim 16, wherein the plurality of application-specific integrated circuits of the preamplifier unit and the at least one master-control-and-interface unit are provided at intervals in a lower part of the housing.

18. The neutral atom imager according to claim 17, wherein the neutral atom imager further comprises a fixed enclosure, the at least one housing is spaced and at an angle in the fixed enclosure, and a middlemost housing of the at least one housings is vertically arranged in the fixed enclosure.

19. The neutral atom imager according to claim 18, wherein the angle between the at least one housings ranges from 3° to 60°.

20. A neutral atom imaging method, comprising the following operations:
obtaining neutral atoms;
performing Fourier transform on the neutral atoms by using a modulation grid;
detecting, by a semiconductor detector line array, the neutral atoms transformed by Fourier transform, to generate an imaging signal;
wherein the modulation grid includes a plurality of slits and a plurality of slats forming the plurality of slits; the semiconductor detector line array includes a plurality of semiconductor detector strips composed of a plurality of semiconductor detectors; a direction of the semiconductor detector line array is consistent with that of the plurality of slits of the modulation grid; the modulation grid includes a plurality of grid periods, each of the grid periods includes n slits, a width of each of the plurality of semiconductor detector strips is d, widths of the slits vary regularly over a grid period, and a width $w_i$ of an i-th slit of the modulation grid satisfies the following relationship:

$$w_i = \frac{n}{i} \times d.$$

21. The neutral atom imaging method according to claim 20, wherein the obtaining of the neutral atoms includes:
deflecting charged particles, and detecting the neutral atoms.

22. The neutral atom imaging method according to claim 20, further comprising:
amplifying the imaging signals;
processing, packing, and compressing the amplified imaging signal.

23. The neutral atom imaging method according to claim 22, wherein the amplifying of the imaging signal includes:
providing an operation timing to at least one preamplifier unit;
collecting and reading the imaging signal according to the operation timing;
preliminarily fusing and processing the imaging signal.

24. The neutral atom imaging method according to claim 23, wherein the collecting and reading of the imaging signal according to the operation timing includes:
shaping the imaging signal, and converting the imaging signal into an analog signal;
detecting and maintaining a peak value of the imaging signal until the peak value is read out.

* * * * *